Sept. 29, 1964  H. W. GOARD  3,150,500
PURIFICATION OF CRYSTALS

Filed July 5, 1963  3 Sheets-Sheet 1

INVENTOR.
H. W. GOARD
BY Young & Quigg
ATTORNEYS

United States Patent Office 3,150,500
Patented Sept. 29, 1964

3,150,500
PURIFICATION OF CRYSTALS
Howard W. Goard, Bartlesville, Okla., assignor to Phillips Petroleum Company, a corporation of Delaware
Filed July 5, 1963, Ser. No. 293,036
2 Claims. (Cl. 62—124)

This invention relates to the resolution of liquid multi-component mixtures by crystallization. In another aspect, it relates to apparatus for the separation and purification of multi-component mixtures by crystallization. In another aspect, it relates to an improved heat exchange means which can be used in such apparatus.

Purification by means of fractional crystallization has been known for a number of years. Schmidt, U.S. Patent Re. 23,810 (1954), discloses a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

An improvement in the separation of the type described above is that of Thomas, U.S. Patent No. 2,854,494 (1958), which discloses and claims a process wherein the solids in the purification zone are countercurrently contacted with a pulsating flow of reflux liquid by application against the melt of pulsating pressure generated by a pulse pump, the pulsation of the reflux liquid occurring during sustained application of force to the crystals to feed the same into the liquid removal zone. While this improved process has been carried out with much success, one problem which frequently occurs in connection therewith is the structural failure of the heat exchange means used to melt the crystals. The pulsations generated by the pulse pump cause flexing and vibration of the heat exchange means (usually a coil) with subsequent breakage thereof. The resulting short life of such heat exchange means has meant shutdown and replacement as often as once a week, thus increasing the expense of the operation.

Accordingly, an object of this invention is to provide an improved apparatus for purifying crystals, which overcomes in particular the need for shutting down and replacing broken heat exchange means used to melt crystals in the reflux zone. Another object is to provide an improved heat exchange means which is durable and has a long life, notwithstanding subjecting of the same to the fluctuating pressure generated by a pulse pump or the like. Further objects and advantages of this invention will become apparent to those skilled in the art from the following discussion, appended claims, and accompanying drawing, in which:

I have now invented an improved heat exchange means which can be used in the above-described crystal purification apparatus, particularly where the body of melt is subjected to a pulsating pressure of a pulse pump or the like. Briefly, my improved heat exchanger comprises at least one convoluted U-tube, lying substantially in one plane, whose mid-portion is disposed in substantially the center of the convolutions and whose inlet and outlet end portions are substantially tangent to their respective adjacent curved portions of the convoluted U-tube. Preferably, a plurality of such convoluted U-tubes are nested together in one plane, with the convoluted leg portions of each U-tube spaced from each other and from the adjacent leg portions of the other U-tubes in said plurality to provide passages through the nested U-tube assembly. Although the heat exchanger of this invention is particularly applicable, as mentioned above, in said crystallizer apparatus, and its utility will be described as applied thereto, it should be obvious that it can be used in other apparatus wherever a pancake-like heat exchanger is desired.

Figure 1:
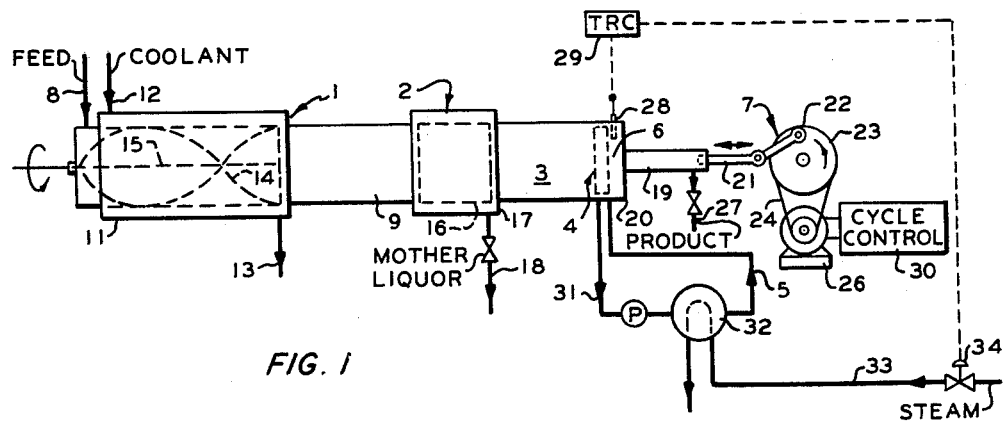
FIGURE 1 is an elevational view, partly in section, illustrating one embodiment of this invention.

Referring now to FIGURE 1 of the drawing, there is illustrated a fractional crystallization apparatus which comprises freezing or crystallizing means 1, a filtering means 2, a reflux zone 3, a melting zone in which is disposed a heating means-crystal barrier assembly 4, a surge zone 6 containing melted crystals, and a pulsation-producing device 7.

A feed mixture comprising two or more components, one of which is separable from the mixture by crystallization, is pumped into the apparatus through feed inlet 8 into crystallizing section 1 of the main purification column. This crystallizing section 1 is composed of a cylindrical shell 9, to which is attached a cooling jacket 11 having an inlet 12 and outlet 13 for a coolant. Positioned within the crystallizing section is an agitating or scraping means 14, which is designed to prevent the accumulation of solid material on the heat exchange surface. Scraping means 14 is suitably constructed of strips of metal fabricated in the form of a helix and mounted on a rotatable shaft 15. Any other suitable type of scraping means can be used. Sufficient cooling in the crystallizing section 1 is provided so that a predetermined amount of solid crystals is produced. The resulting crystal mass and mother liquor are passed into the filtering means 2.

Filtering means 2 comprises a suitable filter 16, such as a metallic screen, a sintered perforate metal member or a perforate metal member supporting a filter cloth, this filter being positioned integrally with respect to the shell 9. The filter 16 is surrounded by an external shell 17 having an outlet 18 for filtrate (mother liquor). The remaining crystal mass passes through reflux zone 3 wherein it is contacted in a countercurrent manner with liquid reflux produced as subsequently described.

A melting zone is maintained near the downstream end of the crystallizing apparatus and it is here where the heating means-crystal barrier assembly 4 is located. Assembly 4 comprises the improved heat exchanger of this invention, through which heat exchanger a suitably heated fluid is pumped, and a crystal barrier, such as one or more perforate plates and screens. Assembly 4 causes the melting of the crystal bed adjacent thereto and serves as a barrier to prevent crystals from passing into the end of the column to which a product outlet cylinder 19 is attached. Cylinder 19 is attached to the downstream closure plate 20 of the apparatus, for example by welding. A pulse pump or the like is connected to the crystallizer. For example, reciprocally mounted in cylinder 19 is a rod or piston 21, which is attached to a crank means 22, the latter being rotated by means of sheave 23, belt 24 and motor 26. A cycle control device 30, of known design, can be operatively connected to motor 26 so that an electrical pulse is produced in synchronism with pulsating rod 21, the frequency of pulses being, for example, from 50 to 400 pulses per minute. Cylinder 19 is provided with an outlet pipe 27 for removal of some of the melt as the purified product of the process. The remainder of the melt is forced through assembly 4 by the pulse pump into the reflux zone 3 to effect crystal purification.

A suitable thermocouple 28 or the like can be transversely mounted adjacent the heater means-crystal barrier assembly 4 and it is operatively connected to a suitable temperature recorder controller 29. The heat exchanger of assembly 4 can be connected by lines 5, 31 to a suitable heat exchanger 32, where heat is supplied by a suitable heat exchanger medium, such as steam 33. The melting of the crystals by the apparatus can accordingly be controlled by regulating the flow of heat exchange medium in line 33 by flow control valve 34, which is operatively connected to temperature recorder controller 29.

Figure 2:
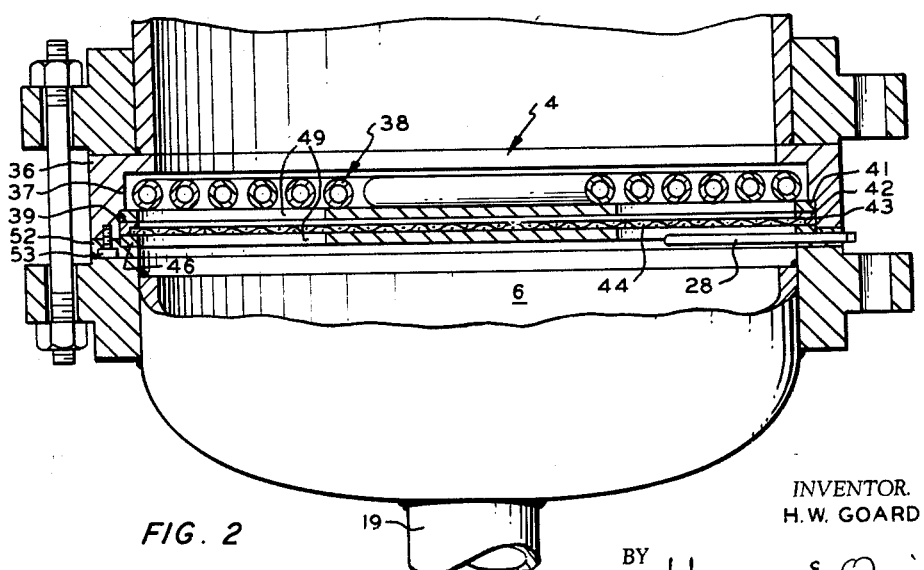
FIGURE 2 is an elevational view in cross section of a portion of FIGURE 1 in detail.
Figure 3:
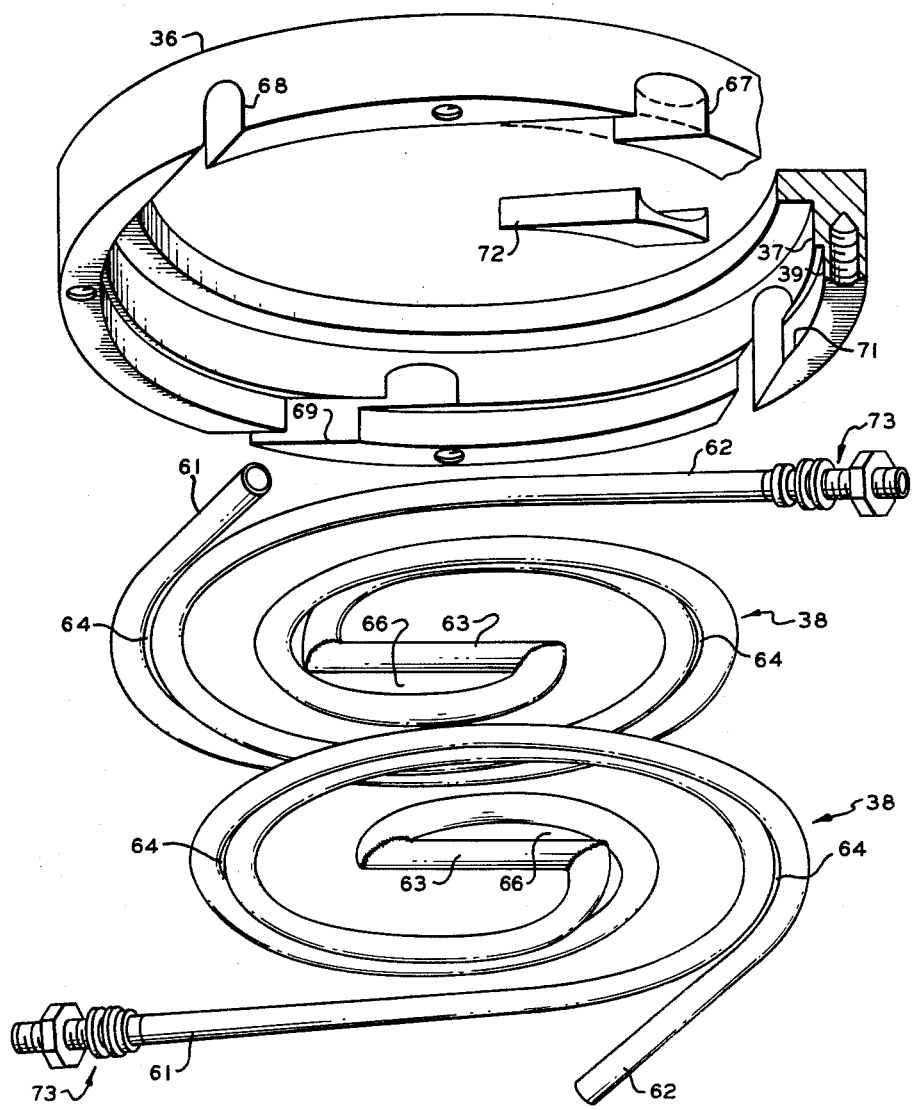
FIGURES 3 and 4 are exploded views in perspective of portions of FIGURE 2 illustrating details thereof.
Figure 4:
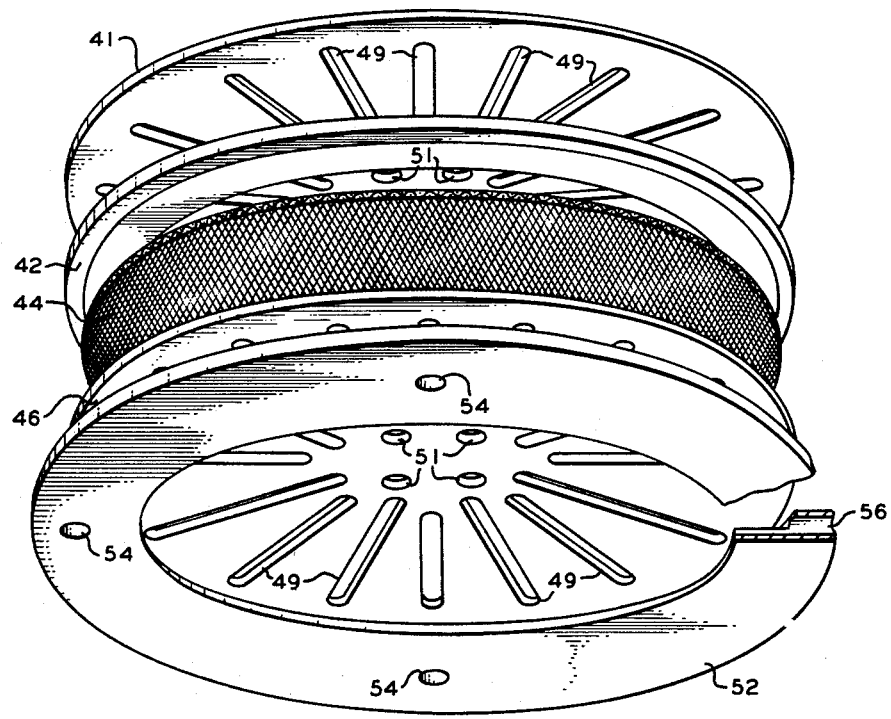

Referring now to FIGURES 2, 3, and 4, assembly 4, with the improved heat exchange means of this invention, is shown in detail. This assembly comprises a heater ring 36 having a recessed portion 37 within which one or more of the convoluted U-tubes or coils 38 of this invention are positioned. Heater ring 36 is also provided with a second recessed portion 39, somewhat larger in diameter than recessed portion 37, in which a back-up plate 41 is disposed, which serves to support the convoluted U-tube(s) 38. The lower portions of the U-tubes can be brazed or otherwise fastened to backup plate 41. A spacer ring 42 is positioned next to the back-up plate 41 in the second recessed portion 39, and it has a recessed portion 43 in which one or more screens 44 are positioned, such as 24 x 10 inch mesh Dutch screen, or a pair of such screens. Screen 44 is held in place and supported by a second back-up plate 46 which is also disposed in the second recessed portion 39 of the heater plate 46. Both of the back-up plates 41 and 46 have perforations therein which are vertically coincident and provide continuous passage for liquid or melt. These passages preferably comprise a plurality of radial slots 49 and center holes 51. Convoluted U-tube(s) 38, back-up plate 41, spacer ring 42, screen 44 and back-up plate 46 are held in position within the recessed portions of heater ring 36 by means of a retaining ring 52, which is attached to the heater ring by means of screws 53, retaining ring 52 having a plurality of circumferentially spaced openings 54 for passage of such screws. Retaining ring 52 is provided with a passage 56 for insertion of thermocouple 28, the inner portion of which may be disposed in one of the radial slots of back-up plate 46.

Referring now to FIGURE 3, in particular the convoluted U-tubes 38 of this invention which are shown in detail. Each of convoluted U-tubes 38 has an inlet end portion 61 and an outlet end portion 62 as well as a mid portion 63. Each U-tube 38 can be made from one piece of straight tube, with appropriate convolutions spiraled around mid-portion 63, but preferably is made in three welded pieces as shown, the middle piece being a short, straight pipe serving as the mid portion 63. Note that the convoluted leg portions of each U-tube 38 are slightly spaced from each other to provide a convoluted clearance 64, the inner end 66 of which is enlarged. Note also that the inlet end and outlet end portions 61 and 62, respectively, are straight and each are tangent to their respective adjacent curved portions of the U-tube. Heater ring 36 is provided with slots or openings to allow the inlet and outlet portions of each U-tube 38 to pass therethrough. For example, heater ring 36 is provided with tangential slots 68 and 67 to permit the passage therethrough of inlet and outlet end portions of 61 and 62 of one U-tube 38, and tangential slots 69 and 71 to permit passage of the inlet and outlet end portions of 61 and 62 of another U-tube 38 when the two U-tubes are nested together in the same plane. When the inlet and outlet end portions of U-tubes 38 are thus fitted within the slots of the heater ring and brazed, welded, or otherwise fastened thereto, plugs, such as plugs 72, are fitted around the exposed portion of the so-fitted U-tube and welded or brazed thereto. The inlet and outlet ends of each of the U-tubes can be provided with suitable fittings 73 for connection to a heat exchange medium supply.

It should be obvious that the number of nested U-tubes, and the number of convolutions which each U-tube has, will vary and be dependent upon the size of the tubing employed, the diameter of the heater ring in which the U-tubes are disposed, and the heat exchange surface or capacity desired.

The improved heat exchange means of this invention can be used in separating and purifying in a crystallizer column mixtures comprising any combination of two or more components, such as those disclosed in U.S. Patents Re. 23,810 and 2,854,494. The subject invention has proven especially useful in resolving a mixture of xylenes to cover para-xylene. For example, a xylenes mixture containing about 67 percent para-xylene was resolved in a crystallizer column (like that shown in the drawing) having a 10 inch diameter, the melting zone of which column was fitted with two nested, convoluted U-tubes (like FIGURE 3), each of which had a ⅝-inch O.D., a 0.035-inch wall, a length of about 70 inches and 1½ convolutions with an overall "diameter" of 8¾ inches. The U-tubes were made out of stainless steel and were supplied with a xylenes mixture, as a heat exchange medium, at a rate of 11,310 pounds per hour or 26 gallons per minute. The xylenes column feed was supplied to the column at 18° F. and in the melting zone the heat exchange means supplied a heat input of 39,585 B.t.u. per hour, the inlet temperature of the heating means being 135° F. and the outlet temperature thereof being 127° F. The column was operated with a pulse frequency of about 170 cycles per minute and produced a para-xylene product having a 99.4 percent purity and a temperature of 61° F. at a product rate of 65 gallons per hour. The operation of the column with said heating means was continued several months without structural failure of the U-tubes comprising the improved heat exchange means of this invention.

Various modifications and alterations of this invention will become apparent to those skilled in the art without departing from the scope and spirit of this invention, and it should be understood that this invention is not to be limited unduly to that set forth herein for illustrative purposes.

I claim:
1. Apparatus for the separation and purification of a component from a mixture of components by crystallization, comprising an elongated closed cylinder, means to introduce said mixture into one end of said cylinder, means adjacent said one end to cool said mixture to crystallize said one component, means to move the resulting crystals through said cylinder to the other end thereof, means intermediate the ends of said cylinder to withdraw mother liquor therefrom, outlet means in said other end to remove melted crystals from said cylinder, heat exchange means within said cylinder and adjacent said other end thereof, said heat exchange means comprising a plurality of nested convoluted U-tubes, lying substantially in one plane transverse to said cylinder, each one of said U-tubes having a mid-portion which is disposed in substantially the center of the convolutions of the U-tube and inlet and outlet portions which are substantially tangent to their respective adjacent curved portions of the U-tube, with the convoluted leg portions of each U-tube being spaced from each other and from the adjacent leg portions of the other U-tubes in said plurality to provide passages through said nested plurality of U-tubes, a ring in which said nested plurality is disposed and encircled thereby, said ring having two tangential openings in the wall thereof for each of said U-tubes to permit the said inlet and outlet portions thereof to extend through said wall of said ring and exterior to said cylinder, a pair of circular perforated plates and at least one circular screen disposed between said plates, said plates and screen being disposed within said ring and encircled thereby and next to said heat excahnge means on the downstream side thereof, and means to supply a heating fluid medium to the inlets of said U-tubes and withdraw the same from the outlets of said U-tubes.

2. Apparatus according to claim 1 wherein pulsation means are disposed within said outlet means.

References Cited in the file of this patent

UNITED STATES PATENTS

| | | |
|---|---|---|
| 190,082 | Scharmann | Apr. 24, 1877 |
| 687,044 | Crawford | Nov. 19, 1901 |
| 2,854,494 | Thomas | Sept. 30, 1958 |